United States Patent [19]
Ono

[11] Patent Number: 4,672,465
[45] Date of Patent: Jun. 9, 1987

[54] IMAGE FORMING APPARATUS

[75] Inventor: Ken'ichi Ono, Kawasaki, Japan

[73] Assignee: Kabushiki Kaisha Toshiba, Kawasaki, Japan

[21] Appl. No.: 753,340

[22] Filed: Jul. 9, 1985

[30] Foreign Application Priority Data

Jul. 10, 1984 [JP] Japan ............................... 59-142606

[51] Int. Cl.[4] ........................ H04N 1/21; G03G 15/00

[52] U.S. Cl. ................................ 358/296; 355/3 SH; 355/14 SH

[58] Field of Search ............... 358/296, 287, 288, 303; 355/14 SH, 14 C, 3 SH, 8; 346/76 PH

[56] References Cited

U.S. PATENT DOCUMENTS

| | | | |
|---|---|---|---|
| 4,338,020 | 7/1982 | Yukawa et al. | 355/14 SH X |
| 4,350,439 | 9/1982 | Tanioka et al. | 355/14 SH |
| 4,562,485 | 12/1985 | Maeshima | 358/296 X |

*Primary Examiner*—E. A. Goldberg
*Assistant Examiner*—Linda M. Peco
*Attorney, Agent, or Firm*—Cushman, Darby & Cushman

[57] ABSTRACT

In an image forming apparatus in which an image is formed on a paper sheet in accordance with image information, the feeding path to which paper sheets are supplied is provided with a shape detecting unit to detect the shape of the paper sheets. In accordance with the shape of the sheet detected by the detection unit, the heat transfer unit forms an image within the confines of the sheet.

19 Claims, 16 Drawing Figures

IMAGE FORMING APPARATUS

BACKGROUND OF THE INVENTION

The present invention relates to an image forming apparatus for forming an image by transferring a color medium from a transfer medium to a sheet of paper in accordance with an image pattern.

Among the known color image forming apparatus of this type is a thermal head printer in which different colored inks are melted in accordance with an image pattern and then are transferred to a sheet of paper.

Small, low-priced, noise-free and capable of printing on ordinary paper, thermal head printers have recently been used as output devices of computers and word processors, and in copying apparatuses.

In a printer of this kind, a sheet of paper to which an image is to be printed is automatically supplied from a paper supply cassette or manually supplied by using a manual feed guide. By operating sheet size selecting keys, an image can be formed on the paper sheet of the selected size in such a manner that the image region is not located beyond the confines of the paper sheet.

However, the size of sheets which the operator can designate is limited to a standard size, such as A4 size and letter size. If a paper sheet of a nonstandard size is used, or if a paper sheet is supplied at an angle by accident, the paper sheet will not conform with the shape or size of an image region to be formed. As a result, part of the image region may be located outside of the paper sheet. Since the image located in such a part is transferred to the platen supporting the paper sheet, the platen may be stained, causing the paper sheet supplied next to be stained.

SUMMARY OF THE INVENTION

The object of the present invention is to provide an image forming apparatus capable of forming an image on a sheet of paper without staining the platen.

According to one aspect of the invention, there is provided an image forming apparatus, comprising: sheet feeding means for feeding a sheet of paper; image forming means for forming an image on the sheet of paper; detecting means, disposed in said sheet feeding means, for detecting the shape of the sheet and producing a shape detection signal; and control means for controlling said image forming means in response to the shape detection signal such that said image forming means forms the image in accordance with the shape of the sheet and within the confines of the sheet.

DETAILED DESCRIPTION OF THE PREFERRED EMBODIMENT

One embodiment of the invention, i.e., a thermal head printer 10, will be described with reference to FIGS. 1–14.

Figure 1:
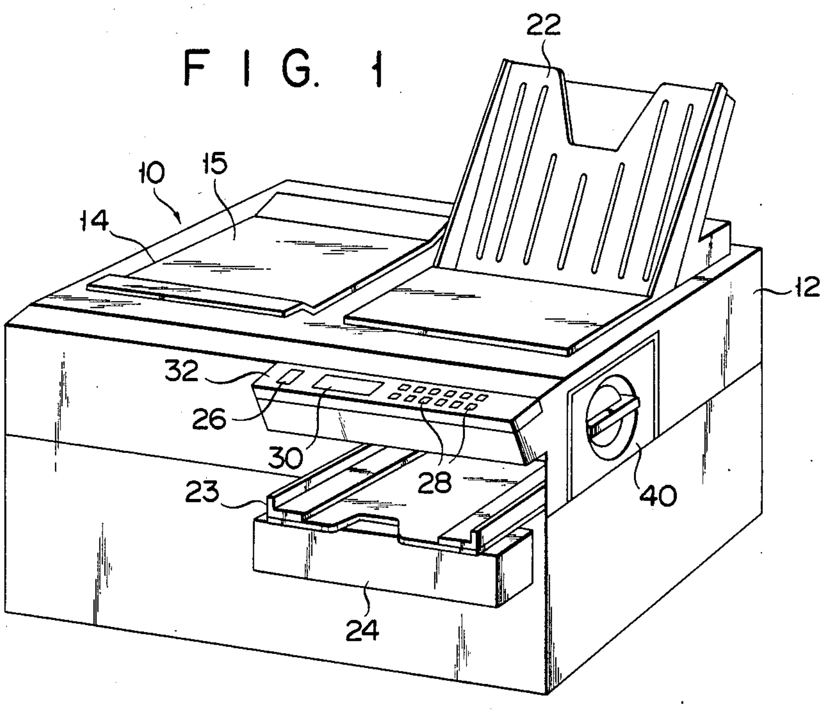
FIG. 1 is a perspective view of a thermal head printer according to the embodiment of the present invention.
Figure 2:
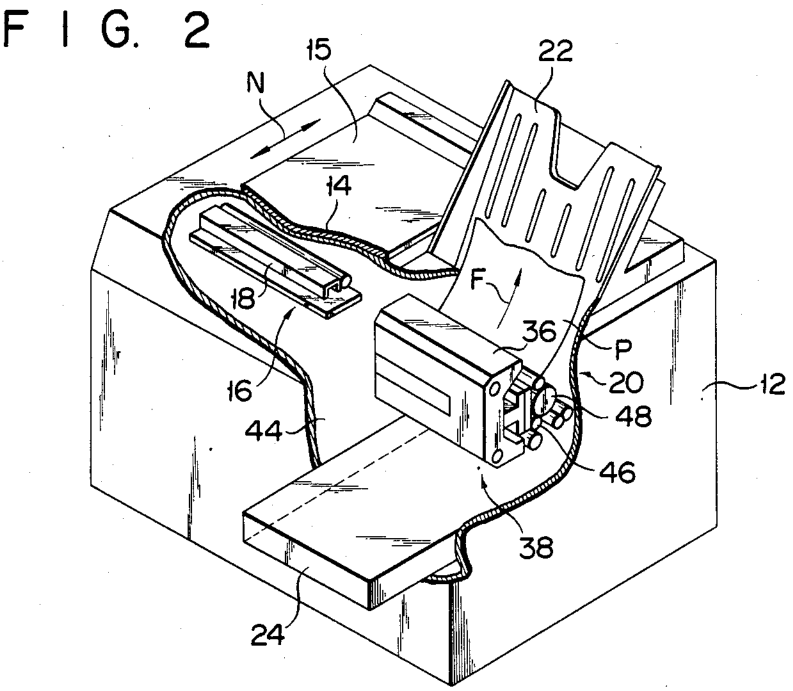
FIG. 2 is a cutaway, perspective view of the printer shown in FIG. 1.

As shown in FIGS. 1 and 2, printer 10 comprises a housing 12 and a document table 14 provided on the top of housing 12. Table 14 is a transparent plate, e.g., a glass plate. A cover 15 is provided to cover a document placed on table 14. A scanning section 16 is arranged below document table 14 to scan the document placed on table 14. Section 16 has an exposure system 18 which can move in the direction of arrow N to apply light onto the document. Section 16 can convert the information printed on the document into electrical signals. A heat transfer unit 20 is provided substantially at the center of housing 12 to print an image on a sheet P of paper according to the signals output by section 16.

A tray 22 extends upwardly from the top of housing 12 to receive a printed sheet P moving in the direction of arrow F. A paper cassette 24 is detachably inserted in a slot cut in the front wall of housing 12 to supply sheets P of paper to heat transfer unit 20. A rotatable manual feed guide 23 is attached to the front wall of housing 12, right above paper cassetter 24, to guide sheets P one by one to unit 20 as the operator feeds the sheets P by hand. An operation panel 32 with a start button 26, ten keys 28 and a display 30 is provided on the front portion of the top of housing 12. Display 30 can display the message "PAPER JAMMING" or the like.

Within housing 12, heat transfer unit 20 adjoins a ribbon cassette holding section 38 with a holder 42. Holder 42 holds a ribbon cassette 36 containing a roll of ribbon 34. Section 38 has a door 40 which is opened when cassette 36 is moved to holder 42 and is closed when cassette 36 is pulled from holder 42.

Heat transfer unit 20 is provided with a thermal head 46 having a plurality of heating elements arranged in a matrix. These elements are selectively energized by pattern signals supplied from section 16 to heat that portion of ribbon 34 which is exposed from cassatte 36, to thereby melt the color ink and transfer the same to a sheet P of paper. A platen 48 is arranged along thermal head 46, and ribbon 34 is placed in the gap between platen 48 and head 46. Head 46 can be moved to press ribbon 34 and sheet P onto platen 48 so that melted ink may be transferred from ribbon 34 to sheet P. A board 50 is provided at the back of thermal head 46 to radiate the heat generated by head 46.

Heat transfer unit 20 will now be described in more detail with reference to FIG. 3. A sheet-feeding roller 52 is positioned above the front portion of cassette 24 to feed sheets P to the ink transfer position. A pair of guide plates 54 are provided near roller 52 to guide one sheet P at a time. A pair of resist rollers 56 are located near the distal ends of guide plates 54 to align the leading edge of sheet P with a reference point. Pressure rollers 57 and 58 extend parallel to platen 48. They can resist rollers 56 against platen 48 and to guide sheet P to the ink transfer position. A guide roller 60 is arranged between thermal head 46 and pressure roller 57, and another guide roller 62 is provided between head 46 and pressure roller 58.

Tray 22 comprises three plates 64, 66 and 68 formed integrally and extending upwardly from heat transfer unit 20. Plate 64 guides a printed sheet P upward, and plates 66 and 68 temporarily hold sheets P. A pair of discharge rollers 70 are arranged at the lower end of plate 64 to guide printed sheets P from heat transfer unit 20 to plate 64. Rollers 70 are coupled to tray 22, thus forming a unit detachable from housing 12.

A first selector guide 72 is privotally mounted on the lower end portion of plate 66 and positioned between resist rollers 56, on the one hand, and platen 48, on the other, to select the direction in which printed sheet P is to be conveyed. Guide 72 guides sheet P from resist rollers 56 to platen 48 and, further from platen 48 to plate 66. A second selector guide 74 is pivotally mounted on the lower end portion of plate 68 and located between rollers 70, on the one hand, and platen 48, on the other, to guide sheet P to plate 64 and farther to plate 68.

Figure 3:
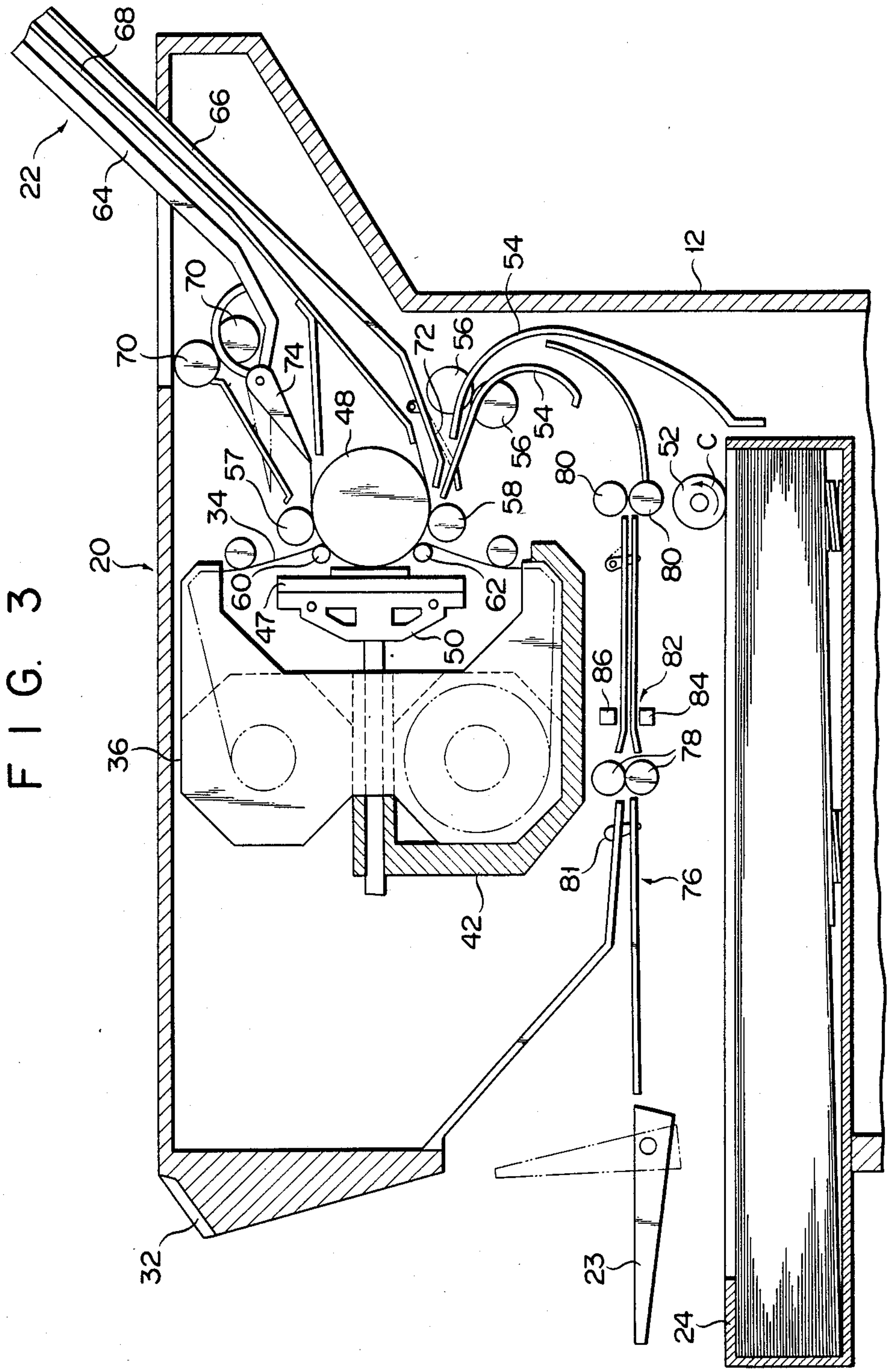
FIG. 3 is a longitudinal, sectional view of the printer of FIG. 1.
Figure 4:
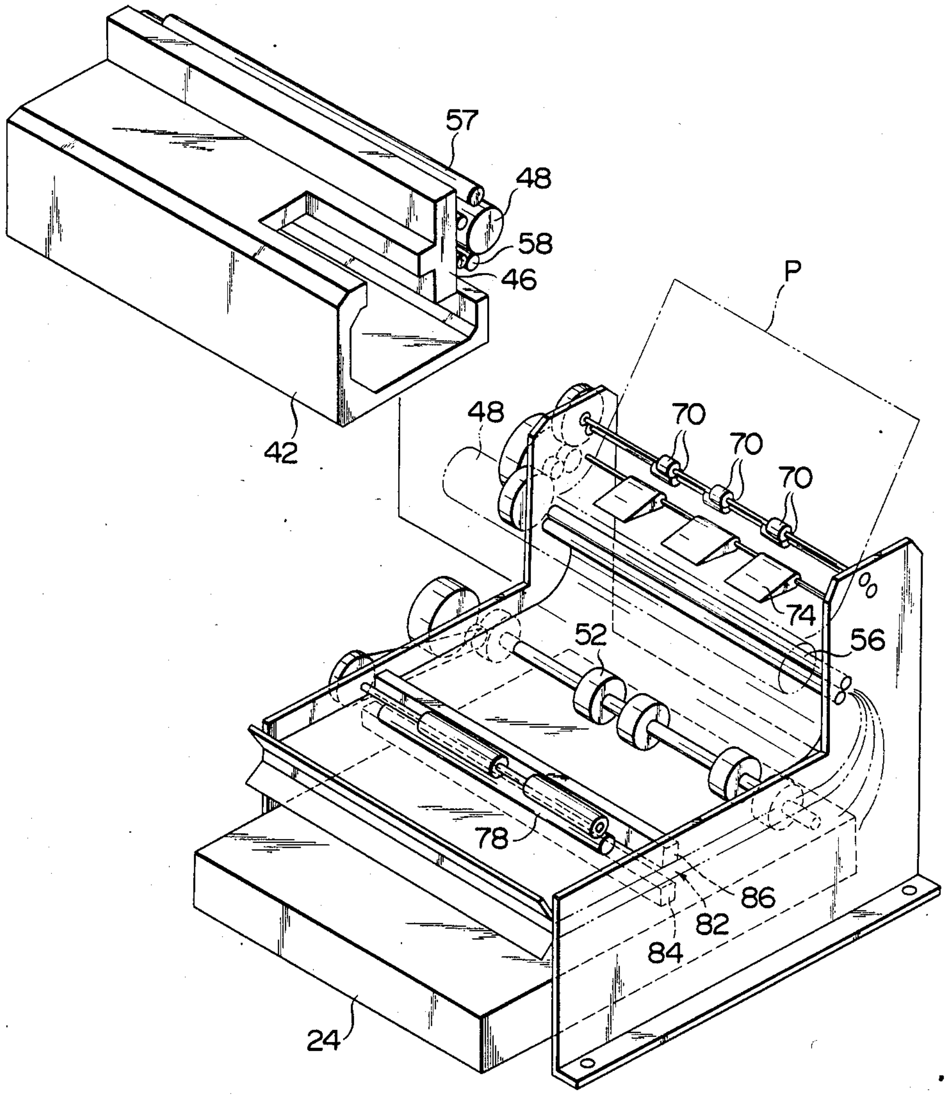
FIG. 4 is an exploded, perspective view of the image forming section of the printer of FIG. 1.

A description may now be given, with reference to FIGS. 3 and 4, of a feeding path 76 to which paper sheets are supplied from manual feed guide 23. This feeding path 76 is located above paper cassette 24 inserted into housing 12, and extends from manual feed guide 23 to guide plates 54. Feeding path 76 is provided with a pair of taking-in rollers 78 for taking in a paper sheet which is manually inserted by the operator. It is also provided with another pair of conveying rollers 80 for conveying the paper sheet toward the gap between guide plates 54. On feeding path 76, a detecting lever 81 is provided between manual feed guide 23 and taking-in rollers 78 to detect the forward end of the paper sheet. A shape detecting unit 82 is provided on the discharge side of taking-in rollers 78 to detect the shape of the paper sheet supplied to feeding path 76. Shape detecting unit 82 comprises an array 84 of light emitting elements and an array 86 of light receiving elements, and these arrays 84 and 86 are disposed to face each other from opposite sides of feeding path 76.

Figure 5:
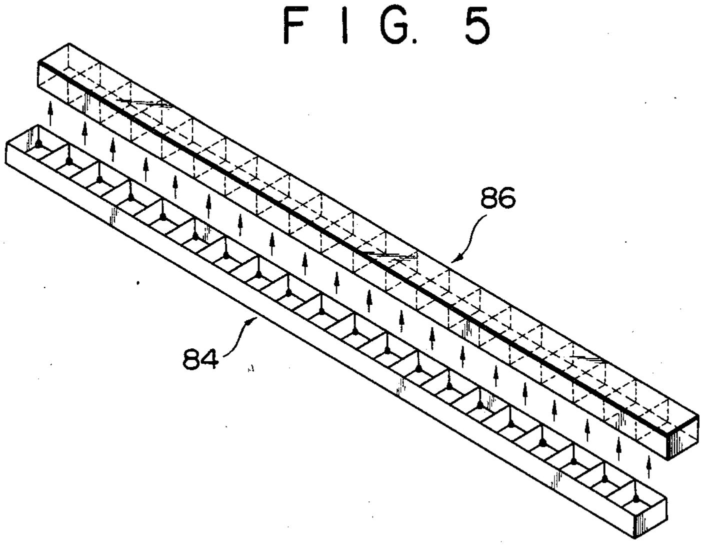
FIG. 5 is a perspective view of the shape detecting section of the printer of FIG. 1.
Figure 6:
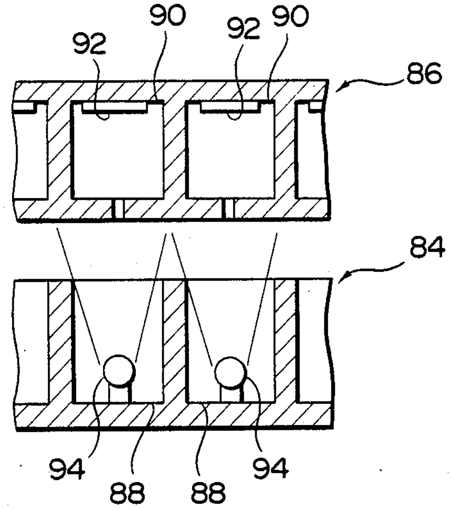
FIG. 6 is an enlarged, sectional view showing part of the shape detecting section shown in FIG. 5.

As shown in FIGS. 5 and 6, arrays 84 and 86 include elements 88 and 90, respectively, which are arranged to form a line parallel to the widthwise direction of feeding path 76. In array 86, a photodiode 92 is provided to each element 90, and in array 84, a light emitting diode 94 is provided to each element 88. In the case of shape detection of a paper sheet, each light emitting element 88 emits lights at regular time intervals in accordance with a pulse signal supplied thereto from a CPU (central processing unit) which will be described later. Since the light emitted from light emitting array 84 is intercepted when the paper sheet P passes shape detecting unit 82, the light which light receiving array 86 receives varies in accordance with the width of the paper sheet, and only the elements 90 which receive the light produce a light reception signal. This light reception signal is supplied to the CPU as a width detection signal. Further, since light emitting array 84 intermittently emits light at predetermined time intervals when paper sheet P passes shape detecting unit 82, the lengthwise shape of paper P can be detected. Like the width detection signal, this signal is supplied to the CPU as a length detection signal. By detecting the width and length of paper sheet P in relation to time in the above manner, it is possible to reliably detect the whole shape of paper sheet P. How the printing operation is controlled in accordance with these shape detection signals will be described later.

Figure 7:
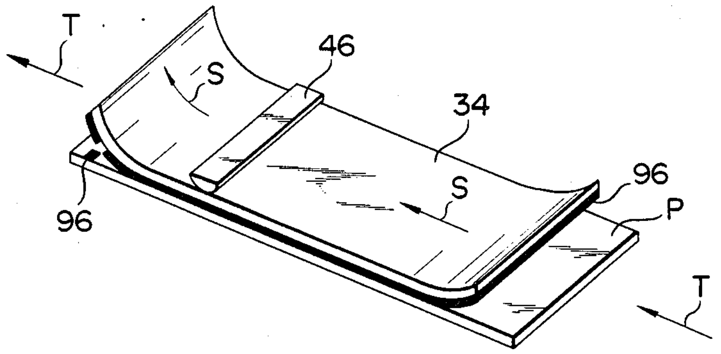
FIG. 7 illustrates how color ink is transferred from a ribbon to a sheet of paper by the printer of FIG. 1.

In the thermal transfer printing using the thermal head 46, as shown in FIG. 7, ink 96 applied to ribbon 34 is heated and melted by thermal head 46, and is transferred to sheet P. During the thermal transfer, ribbon 34 and sheet P move simultaneously in the direction of arrows S and T, respectively.

Figure 8:
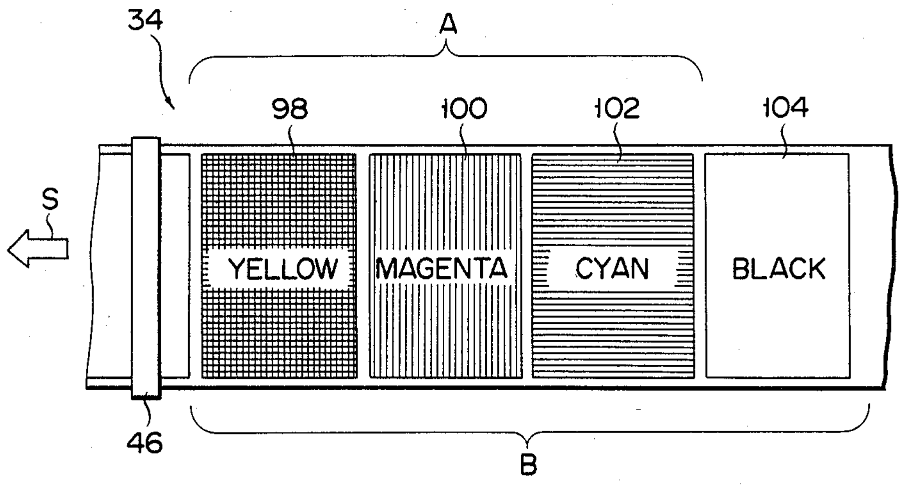
FIG. 8 is a plan view of the ribbon used in the printer of FIG. 1.

As shown in FIG. 8, ribbon 34 of, e.g., ribbon cassette 36 has a continuous range A covering, for example, a yellow-ink region 98, a magenta-ink region 100, and a cyan-ink region 102, or a range B covering all these regions 98, 100 and 102 plus a black-ink region 104. In the transfer, one of the above ink colors is first transferred to sheet P. Then, sheet P is returned to its original position to be subjected to ink transfer for another color. Thus, by repeating this transfer process, some ink colors are superposed to provide a color print. In general, a black color can be obtained by superposing the three colors in range A. A deeper black color may be obtained by using a ribbon having range B which covers the four color-ink regions including the black-ink region 104.

With reference to FIGS. 9 to 12, it will be explained how heat transfer unit 20 transfers colored inks from the ribbon to a sheet P of paper.

Figure 9:
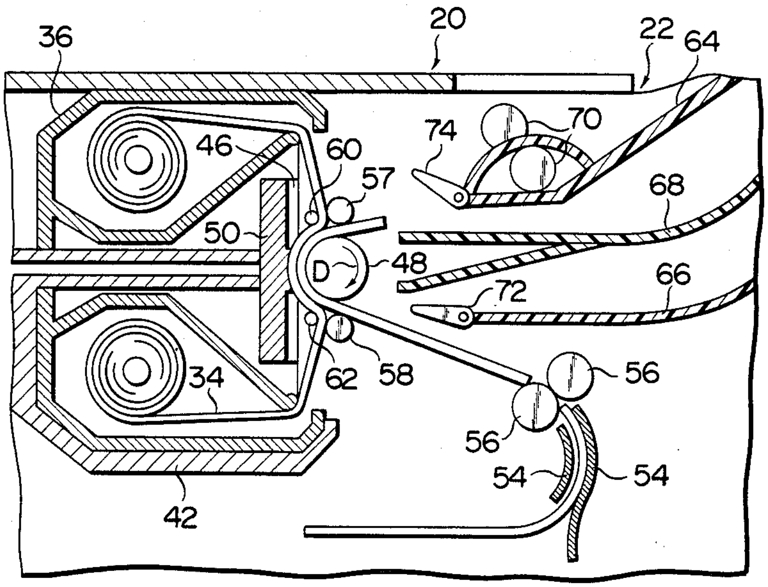
FIGS. 9 to 12 are sectional views of the printer, showing how the printer of FIG. 1 transfers ink from the ribbon to a sheet of paper.

As shown in FIG. 9, when sheet P is guided by plates 54, the leading edge of sheet P is aligned by rollers 56 and is conveyed by rollers 56 to platen 48. Since platen 48 is rotated in the direction of arrow D, sheet P is fed around platen 48 until it opposes ribbon 34. Thermal head 46 transfers the yellow ink from the region 98 of ribbon 34 to sheet P, thus printing a yellow image on sheet P, in response to the signals supplied from exposure system 18.

Figure 10:
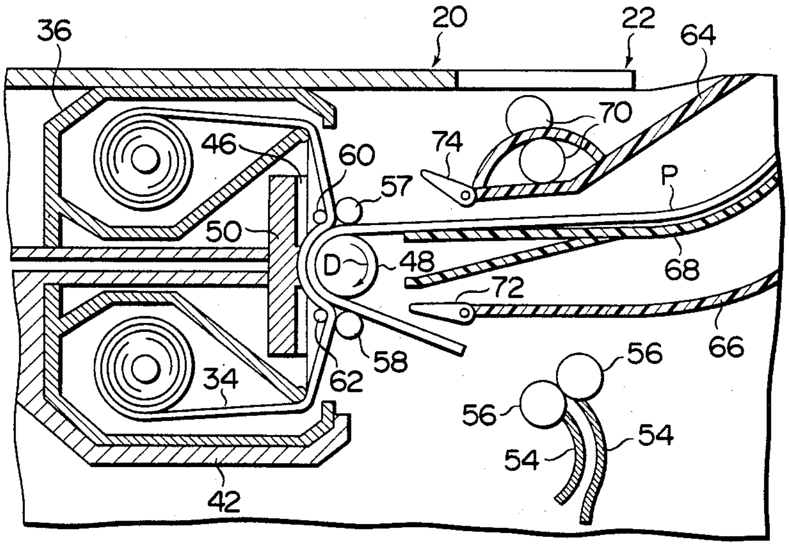
Figure 11:
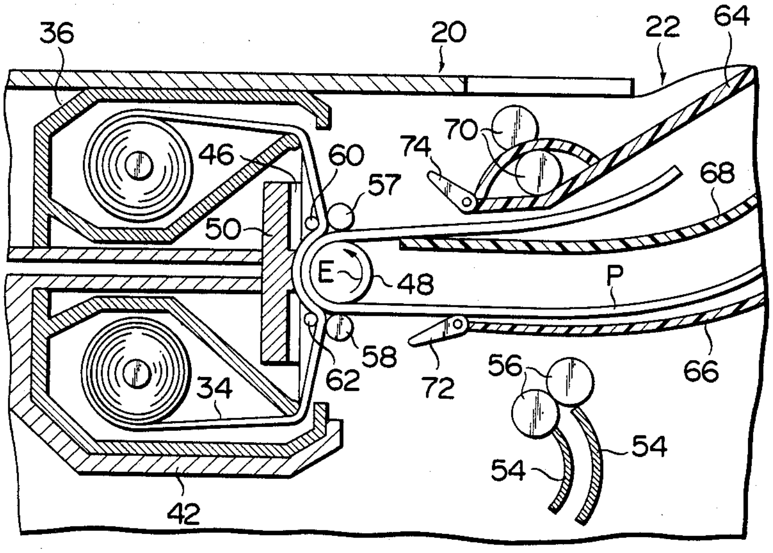
Figure 12:
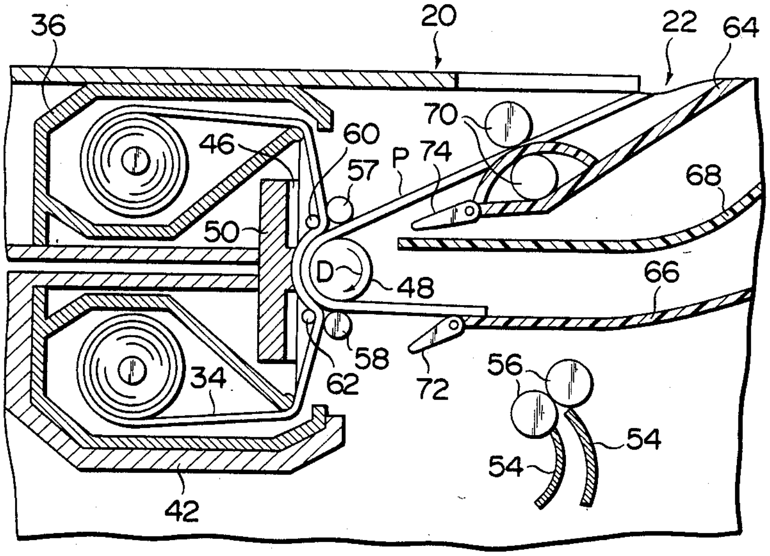
Figure 13:
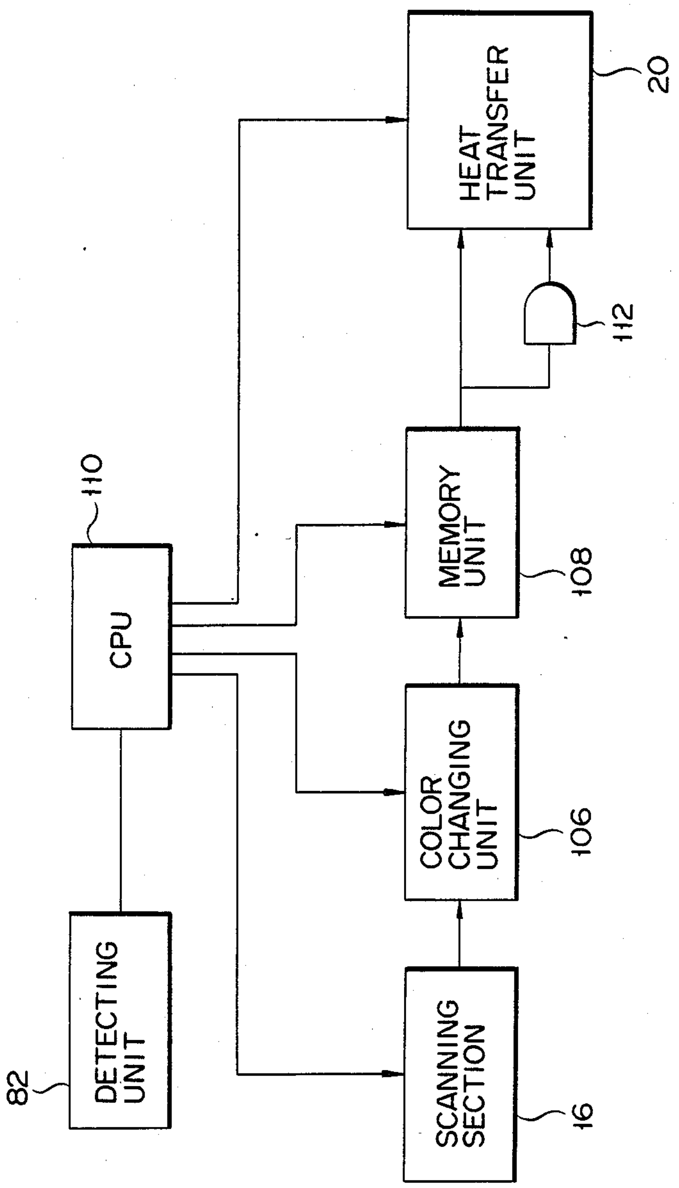
FIG. 13 is a block diagram illustrating the control system used in the printer of FIG. 1.

Then, as shown in FIG. 10, second selector guide 74 is moved up, thus guiding sheet P to plate 68. As shown in FIG. 11, first selector guide 72 is pivoted downward when sheet P rests on plate 68, except for the rear edge portion pinched between ribbon 34 and platen 48. Platen 48 is then rotated in the direction of arrow E, pulling sheet P from plate 68 and conveying the same to plate 66. Since first selector guide 72 is below plate 68, sheet P is smoothly guided on plate 66. When the entire sheet P, except the front edge portion pinched between ribbon 34 and platen 48, is put on plate 66, platen 48 is rotated again in the direction of arrow D as shown in FIG. 12. In the meantime, ribbon 34 is moved, bringing magenta region 100 to the ink transfer position. As sheet P is conveyed around platen 48, thermal head 46 transfers the magenta ink from region 100 to sheet P, thus printing an image in magenta ink, superposing the yellow image, in response to the signals supplied from exposure system 18.

The sequence of operations described in the preceding paragraph is repeated, thereby printing an image in cyan ink, superposing the yellow image and the magenta-ink image. As a result, a color image is formed on sheet P. Sheet P with the color image is discharged onto plate 64.

Thermal printer 10 has a control system for controlling heat transfer unit 20. This system comprises a color changing unit 106, a memory unit 108 and a CPU 110. Units 106 and 108 are arranged between scanning section 16 and heat transfer unit 20. Unit 106 is connected to scanning section 16 and memory unit 108. Color component signals, i.e., yellow, magenta, and cyan signals, are supplied from scanning section 16 to color changing unit 106. Memory unit 108 is connected to heat transfer unit 20. It stores position data showing the positions of the picture elements of the image formed on the document. Unit 20 transfers the color inks from ribbon 34 to sheet P in accordance with the color component signals and the position data. An AND gate 112 is connected between unit 20 and memory unit 108 so as to generate a black signal when yellow, magenta and cyan signals are supplied to it.

Scanning section 16, color changing unit 106, memory unit 108 and heat transfer unit 20 are coupled to CPU 110. Detecting unit 82 is also coupled to CPU 110. The signals relating to the shape of sheet P are supplied to CPU 110 from detecting unit 82. On the basis of those signals, CPU 110 controls the operations of scanning section 16 and heat transfer unit 20. A description may now be given, with reference to FIG. 14, of how the printing operation is controlled by the signals supplied from detecting unit 82.

In the first step 114, manual feed guide 23 is opened, and the operator inserts a sheet P of paper into feeding path 76. Any shape of sheet may be used, such as a round, a triangular, and a star-shaped sheet.

In the second step 116, detecting lever 81 detects the insertion of sheet P into feeding path 76. At this time, detecting lever 81 is rotated. As a result, a switch (not shown) is turned on, and detection signals relating to sheet P are supplied to CPU 110 (See FIG. 13.)

In the third step 118, CPU 110 orders the start of the copying operation in response to the detection signals. For example, taking-in rollers 78, conveying rollers 80, shape detecting unit 82, and scanning section 16 begin to operate.

In the fourth step 120, shape detecting unit 82 detects the shape of sheet P and supplies a shape detection signal to CPU 110. As mentioned above, detailed data on the shape (outline) of sheet P can be obtained with respect to both the lengthwise and widthwise directions of sheet P since the light emitting diodes intermittently emit light.

In the fifth step 122, CPU 110 supplies a control signal to scanning unit 16 in response to the shape detection signals, thereby designating the scanning region of scanning unit 16. If sheet P is triangular, for example, CPU 110 supplies a control signal which limits the scanning region of scanning unit 16 to the shape corresponding to the triangular shape of sheet P.

In the sixth step 124, the original is scanned in accordance with the control signal from CPU 110. The information on the scanned original is sent to CPU 110, where it is stored.

In the seventh step 126, CPU 110 supplies a printing signal (output signal) to heat transfer unit 20. As a result, an image is formed on sheet P in accordance with the image information stored in CPU 110. In this step 126, the above-mentioned color printing operation (illustrated in FIGS. 9–12) is performed.

In the eighth step 128, sheet P on which an image is printed is discharged onto tray 22.

According to the embodiment mentioned above, the area of a document which scanning section 16 reads is limited in accordance with the shape of sheet P. Thus, thermal head 46 does not form an image beyond the confines of sheet P. For this reason, platen 46 is reliably prevented from being stained with ink.

The present invention is not limited to the above-mentioned embodiment. It can be modified in various manners without departing from the spirit of the invention.

Figure 14:
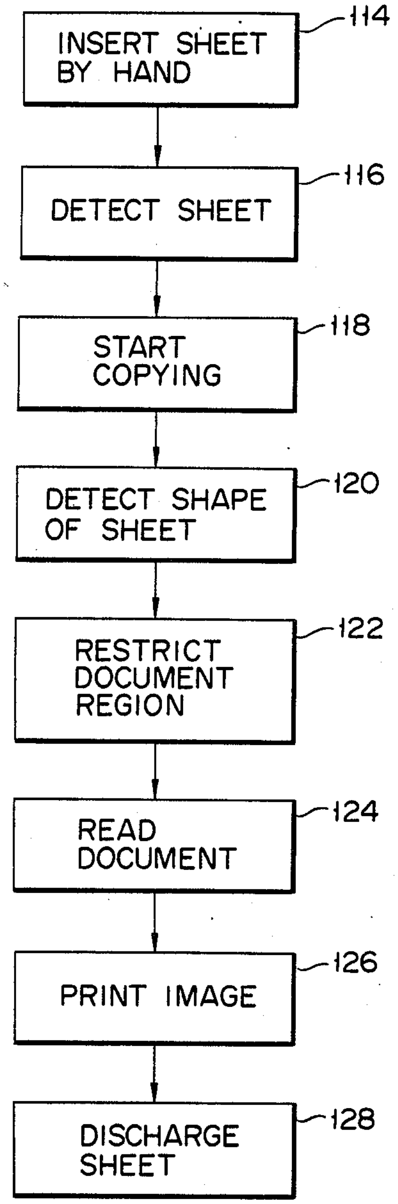
FIG. 14 is a flow chart illustrating the operation of the printer of FIG. 1.
Figure 15:
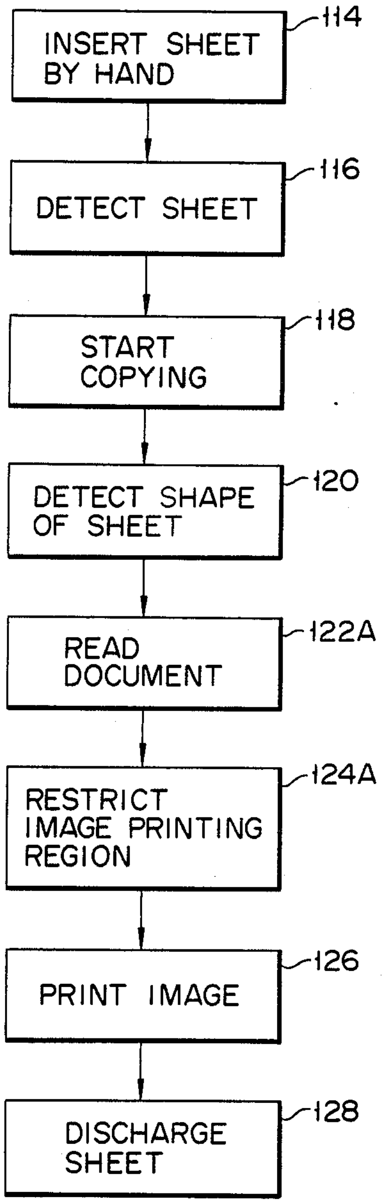
FIG. 15 is a flow chart illustrating the operation of the printer according to one modification of the embodiment of FIG. 1.
Figure 16:
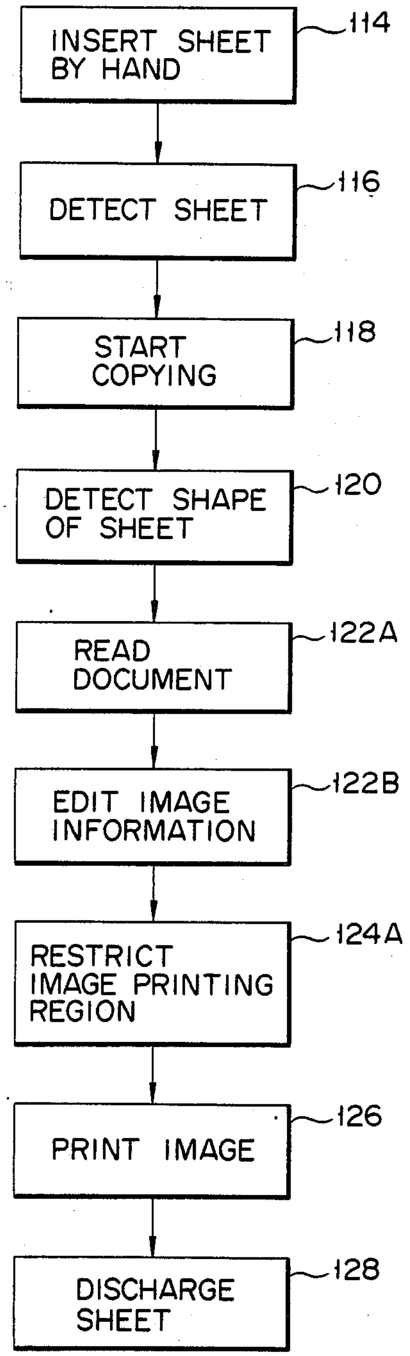
FIG. 16 is a flow chart illustrating the operation of the printer according to another modification of the embodiment.

For example, the printing operation based on the shape detection signals of detecting unit 82 may be performed in the manners shown in the flow charts of FIGS. 15 and 16. How the printing operation is performed will now be described, according to the flow charts of FIGS. 15 and 16. As for the steps common to the flow charts of FIGS. 14–16, the same reference numerals as those used in FIG. 14 are also attached to FIGS. 15 and 16. A detailed description of these steps will be omitted.

In the fifth step 122A shown in FIG. 15, scanning section 16 is not restricted in its scanning region. It scans and reads the whole region on an original.

In the sixth step 124A shown in FIG. 15, CPU 110 controls a printing signal (output signal) to heat transfer unit 20 in accordance with the shape detection signals from shape detecting unit 82. If sheet P is triangular, for example, only the image information corresponding to the region of triangular sheet P is selected, among the image information stored in CPU 110 and representing the whole image on the document. The selected image information is supplied to heat transfer unit 20, together with the printing signal. In this case, the image information which does not correspond to the region within triangular sheet P is excluded from the printing operation.

In the sixth step 122A shown in FIG. 16, scanning section 16 scans the whole region of a document, as in the corresponding step of FIG. 15. The image information obtained is stored in CPU 110.

In the succeeding step 122B, CPU 110 edits the image information in accordance with the shape detection signals supplied from shape detecting unit 82. If sheet P is triangular, for example, the image information are edited in such a manner that the image is printed from the apex of triangular sheet P to the lower regions thereof according to the order in which the image information are obtained by the scanning operation. The image information which are beyond the confines of triangular sheet P are excluded from the printing operation.

In the sixth step 124A shown in FIG. 16, the printing signal (output signal) supplied to heat transfer unit 20 is controlled in accordance with the image information which have been edited by CPU 110. The images corresponding to the image information are successively printed on sheet P, but the images which cannot be printed within sheet P are excluded from the printing operation.

In the embodiment described above, the shape detecting unit for detecting the shape of sheet P is an optical detector, i.e., the unit comprises light emitting elements and light receiving elements. However, the shape detecting unit is not limited to this. It may be designed to mechanically detect the shape of sheet P. In this case, an array of lever elements is used in place of the above-mentioned arrays of light emitting and receiving elements. More specifically, a lever element is suspended to be rotatable. When the lever element is raised by sheet P, it is actuated through the use of a lead switch and generates a detection signal. By arranging a plurality of such lever elements in a row in the widthwise direction of the feeding path, it is possible to detect the shape of sheet P. The lengthwide shape of sheet P can be detected by measuring the time in which the switch is kept on.

Futhermore, the present invention is not limited to a thermal head printer. It may be applied to a copying machine which forms an image by electrostatically transferring a toner onto a sheet of paper, or to an inject printer which forms an image by injecting ink onto a sheet of paper in accordance with the related image information.

In the above-mentioned embodiment, the detecting unit for detecting the shape of a paper sheet is disposed on the sheet feeding path to which a paper sheet manually inserted is supplied. However, it may be disposed on guide plates 54 or immediately before resist rollers 56. If the detecting unit is disposed in these ways, shape detection can be performed not only for paper sheets inserted by hand but also for paper sheets automatically supplied from the paper cassette.

What is claimed is:

1. An image forming apparatus in which an image is formed in accordance with image information, comprising:

sheet feeding means for feeding a sheet of paper;

image forming means for forming an image on the sheet of paper;

detecting means, provided for said sheet feeding means, for detecting the shape of the sheet of paper and producing a shape detection signal; and control means for controlling said image forming means in response to the shape detection signal such that said image forming means forms the image in accordance with the shape of the sheet of paper and within the confines of the sheet of paper.

2. An apparatus according to claim 1, wherein said detecting means includes an array of light emitting elements and an array of light receiving elements arranged to face each other, light from the light emitting elements being intercepted when the sheet of paper passes between said arrays, to thereby optically detect the shape of the sheet of paper.

3. An apparatus according to claim 1, wherein said detecting means is disposed on said sheet feeding means to which a sheet of paper manually inserted is supplied.

4. An apparatus according to claim 3, wherein said sheet feeding means is provided with a detecting lever which detects a sheet of paper supplied to said sheet feeding means before said shape detecting means is actuated.

5. An apparatus according to claim 1, wherein said sheet feeding means is provided with a rotatable manual feed guide, and a sheet of paper is supplied through said manual feed guide.

6. An apparatus according to claim 1, wherein said image forming means is provided with a scanning section for scanning an original, and said control means is provided with a central processing unit for controlling said scanning section such that said scanning section scans only the region of an original which corresponds to the shape of the sheet detected by said shape detecting means.

7. An apparatus according to claim 1, wherein said image forming means is provided with a scanning section for reading image information from an original by scanning the same, and said control means is provided with a central processing unit for controlling said image forming means such that said image forming means prints out only the image information corresponding to the shape of the sheet of paper among all the image information on the scanned original.

8. An apparatus according to claim 1, wherein said image forming means is provided with a scanning section for reading image information from an original by scanning the same, and said control means is provided with a central processing unit which can edit the image information such that said image forming means successively prints out the image information on the scanned original in the order in which the image information are obtained by the scanning of the original and in accordance with the shape of the sheet.

9. An image-forming apparatus according to claim 2, wherein said array of light-emitting elements and said array of light-receiving elements are longer than the width of said sheet-feeding means so that the entire shape of a sheet passing between said arrays can be detected.

10. A printer in which an image is formed on a sheet by transferring ink onto the sheet in accordance with an image information signal, comprising:

sheet-feeding means for feeding the sheet of paper;

a head means for transferring ink onto the sheet in accordance with the image information signal;

a platen means for supporting the sheet when ink is transferred onto the sheet;

detecting means, provided for said sheet-feeding means, for detecting the shape of the sheet of paper and producing a shape-detection signal; and control means for controlling said head means in response to the shape-detection signal such that said head means forms the image in accordance with the shape of the sheet of paper and within the confines of the sheet of paper.

11. An apparatus according to claim 10, wherein said detecting means includes an array of light-emitting elements and an array of light-receiving elements arranged to face each other, light from said light-emitting elements being intercepted when the sheet of paper passes between said arrays, to thereby optically detect the shape of the sheet of paper.

12. An image-forming apparatus according to claim 11, wherein said array of light-emitting elements and said array of light-receiving elements have a length greater than the width of said sheet-feeding means so that the entire shape of a sheet passing between said arrays can be detected.

13. An apparatus according to claim 10, wherein said detecting means is disposed on said sheet-feeding means to which a sheet of paper, manually inserted, is supplied.

14. An apparatus according to claim 13, wherein said sheet-feeding means is provided with a detecting lever which detects a sheet of paper supplied to said sheet-feeding means before said shape-detecting means is actuated.

15. An apparatus according to claim 10, wherein said sheet-feeding means is provided with a rotatable manual feed guide through which a sheet of paper is supplied.

16. An apparatus according to claim 10, further comprising a scanning section for scanning an original, and said control means is provided with a central processing unit for controlling said scanning section such that said scanning section scans only the region of an original which corresponds to the shape of the sheet detected by said shape-detecting means.

17. An apparatus according to claim 10, further comprising a scanning section for reading image information from an original by scanning the same and said control means is provided with a central processing unit for controlling said head means such that said head means prints out only the image information corresponding to the shape of the sheet of paper, among all the image information on the scanned original.

18. An apparatus according to claim 10, further comprising a scanning section for reading image information from an original by scanning the same and said control means is provided with a central processing unit which can edit the image information such that said image-forming means successively prints out the image information on the scanned original in the order in which the image information is obtained, by scanning the original, and in accordance with the shape of the sheet.

19. A copying machine in which an image is formed on a sheet of paper in accordance with an original document, comprising:

sheet-feeding means for feeding the sheet;

image-forming means for forming an image on the sheet;

detecting means, provided for said sheet-feeding means, for detecting the shape of the sheet and producing a shape-detection signal; and control means for controlling said image-forming means in response to said shape-detection signal such that said image-forming means forms the image in accordance with the shape of the sheet and within the confines of the sheet.

* * * * *